(12) United States Patent
Schmugar

(10) Patent No.: US 11,323,482 B2
(45) Date of Patent: May 3, 2022

(54) METHODS, SYSTEMS, AND MEDIA FOR PROTECTING COMPUTER SYSTEMS FROM USER-CREATED OBJECTS

(71) Applicant: McAfee, LLC, San Jose, CA (US)

(72) Inventor: Craig David Schmugar, Beaverton, OR (US)

(73) Assignee: McAfee, LLC, San Jose, CA (US)

( * ) Notice: Subject to any disclaimer, the term of this patent is extended or adjusted under 35 U.S.C. 154(b) by 137 days.

(21) Appl. No.: 16/731,692

(22) Filed: Dec. 31, 2019

(65) Prior Publication Data

US 2021/0203699 A1    Jul. 1, 2021

(51) Int. Cl.
  *H04L 29/06* (2006.01)
  *G06F 21/62* (2013.01)

(52) U.S. Cl.
  CPC .......... *H04L 63/20* (2013.01); *G06F 21/6218* (2013.01); *H04L 63/08* (2013.01); *H04L 63/102* (2013.01); *H04L 63/105* (2013.01)

(58) Field of Classification Search
  CPC ....... H04L 63/20; H04L 63/08; H04L 63/102; H04L 63/105; G06F 21/6218
  See application file for complete search history.

(56) References Cited

U.S. PATENT DOCUMENTS

| 8,499,152 | B1 * | 7/2013 | Chen | ................... | H04L 63/1441 |
| | | | | | 713/165 |
| 8,800,043 | B2 * | 8/2014 | Khachaturov | ........ | G06F 21/577 |
| | | | | | 726/25 |
| 8,950,007 | B1 | 2/2015 | Teal et al. | | |
| 2004/0123153 | A1 * | 6/2004 | Wright | ..................... | G06F 21/32 |
| | | | | | 726/1 |
| 2005/0154885 | A1 * | 7/2005 | Viscomi | .............. | G06F 9/44521 |
| | | | | | 713/165 |
| 2007/0028110 | A1 * | 2/2007 | Brennan | ............... | H04L 63/145 |
| | | | | | 713/176 |
| 2007/0028291 | A1 * | 2/2007 | Brennan | ................. | H04L 63/20 |
| | | | | | 726/1 |

(Continued)

OTHER PUBLICATIONS

Extended European Search Report dated May 26, 2021 in EP Patent Application No. 20217790.3, pp. 1-9.

*Primary Examiner* — Jason Chiang
(74) *Attorney, Agent, or Firm* — Byrne Poh LLP

(57) ABSTRACT

Methods, systems, and media for protecting computer systems from user-created objects are provided. In some embodiments, the method comprises: detecting, at a second user device, that an object has been accessed on the second user device; determining whether an exception has occurred by scanning the object on the second user device; in response to determining that the exception has occurred, transmitting, from the second user device to a server, a request for a security policy to be applied by the second user device in connection with the object, wherein the request includes an identifier of the object; receiving, from the server, the security policy; determining, based on the security policy, that the object was created by a first user device associated with an organization the second user device is also associated with; determining whether to allow the object to be accessed by the second user device based on the security policy; and in response to determining that the object is allowed to be accessed, allowing the object to be accessed on the second user device.

18 Claims, 4 Drawing Sheets

(56) References Cited

U.S. PATENT DOCUMENTS

| | | | |
|---|---|---|---|
| 2007/0028302 A1* | 2/2007 | Brennan | H04L 63/14 |
| | | | 726/24 |
| 2007/0028303 A1* | 2/2007 | Brennan | H04L 63/20 |
| | | | 726/24 |
| 2007/0028304 A1* | 2/2007 | Brennan | H04L 63/14 |
| | | | 726/24 |
| 2007/0156670 A1* | 7/2007 | Lim | G06F 9/468 |
| 2011/0047620 A1* | 2/2011 | Mahaffey | H04L 63/1441 |
| | | | 726/23 |
| 2019/0180033 A1* | 6/2019 | Born | G06F 21/53 |
| 2019/0306195 A1* | 10/2019 | Kraemer | G06F 21/552 |
| 2020/0076835 A1* | 3/2020 | Ladnai | H04L 63/1433 |
| 2020/0159947 A1* | 5/2020 | Shenefiel | G06F 21/6218 |
| 2020/0201995 A1* | 6/2020 | Gahlot | G06F 21/565 |

\* cited by examiner

METHODS, SYSTEMS, AND MEDIA FOR PROTECTING COMPUTER SYSTEMS FROM USER-CREATED OBJECTS

TECHNICAL FIELD

The disclosed subject matter relates to methods, systems, and media protecting computer systems from user-created objects.

BACKGROUND

People at organizations, such as businesses or other entities, frequently create objects (e.g., documents, scripts, applications, macros, etc.) that are unique to the organization. Objects are frequently scanned or analyzed by security software used by an organization. However, because such objects are unique to the organization, it can be difficult to accurately determine whether a security threat associated with an organization-specific objects. For example, security software may falsely determine that an organization-specific object is a threat and may block the objects from use within the organization, which can lead to a loss of productivity.

Accordingly, it is desirable to provide methods, systems, and media for protecting computer systems from user-created objects.

SUMMARY

Methods, systems, and media for protecting computer systems from user-created objects are provided.

In accordance with some embodiments of the disclosed subject matter, a method for protecting computer systems from user-created objects is provided, the method comprising: detecting, at a second user device, that an object has been accessed on the second user device; determining whether an exception has occurred by scanning the object on the second user device; in response to determining that the exception has occurred, transmitting, from the second user device to a server, a request for a security policy to be applied by the second user device in connection with the object, wherein the request includes an identifier of the object; receiving, from the server, the security policy; determining, based on the security policy, that the object was created by a first user device associated with an organization the second user device is also associated with; determining whether to allow the object to be accessed by the second user device based on the security policy; and in response to determining that the object is allowed to be accessed, allowing the object to be accessed on the second user device.

In accordance with some embodiments of the disclosed subject matter, a system for protecting computer systems from user-created objects is provided, the system comprising: a memory; and a hardware processor coupled to the memory that is programmed to: detect, at a second user device, that an object has been accessed on the second user device; determine whether an exception has occurred by scanning the object on the second user device; in response to determining that the exception has occurred, transmit, from the second user device to a server, a request for a security policy to be applied by the second user device in connection with the object, wherein the request includes an identifier of the object; receive, from the server, the security policy; determine, based on the security policy, that the object was created by a first user device associated with an organization the second user device is also associated with; determine whether to allow the object to be accessed by the second user device based on the security policy; and in response to determining that the object is allowed to be accessed, allow the object to be accessed on the second user device.

In accordance with some embodiments of the disclosed subject matter, non-transitory computer-readable media containing computer executable instructions that, when executed by a processor, cause the processor to perform a method for protecting computer systems from user-created objects, the method comprising: detecting, at a second user device, that an object has been accessed on the second user device; determining whether an exception has occurred by scanning the object on the second user device; in response to determining that the exception has occurred, transmitting, from the second user device to a server, a request for a security policy to be applied by the second user device in connection with the object, wherein the request includes an identifier of the object; receiving, from the server, the security policy; determining, based on the security policy, that the object was created by a first user device associated with an organization the second user device is also associated with; determining whether to allow the object to be accessed by the second user device based on the security policy; and in response to determining that the object is allowed to be accessed, allowing the object to be accessed on the second user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
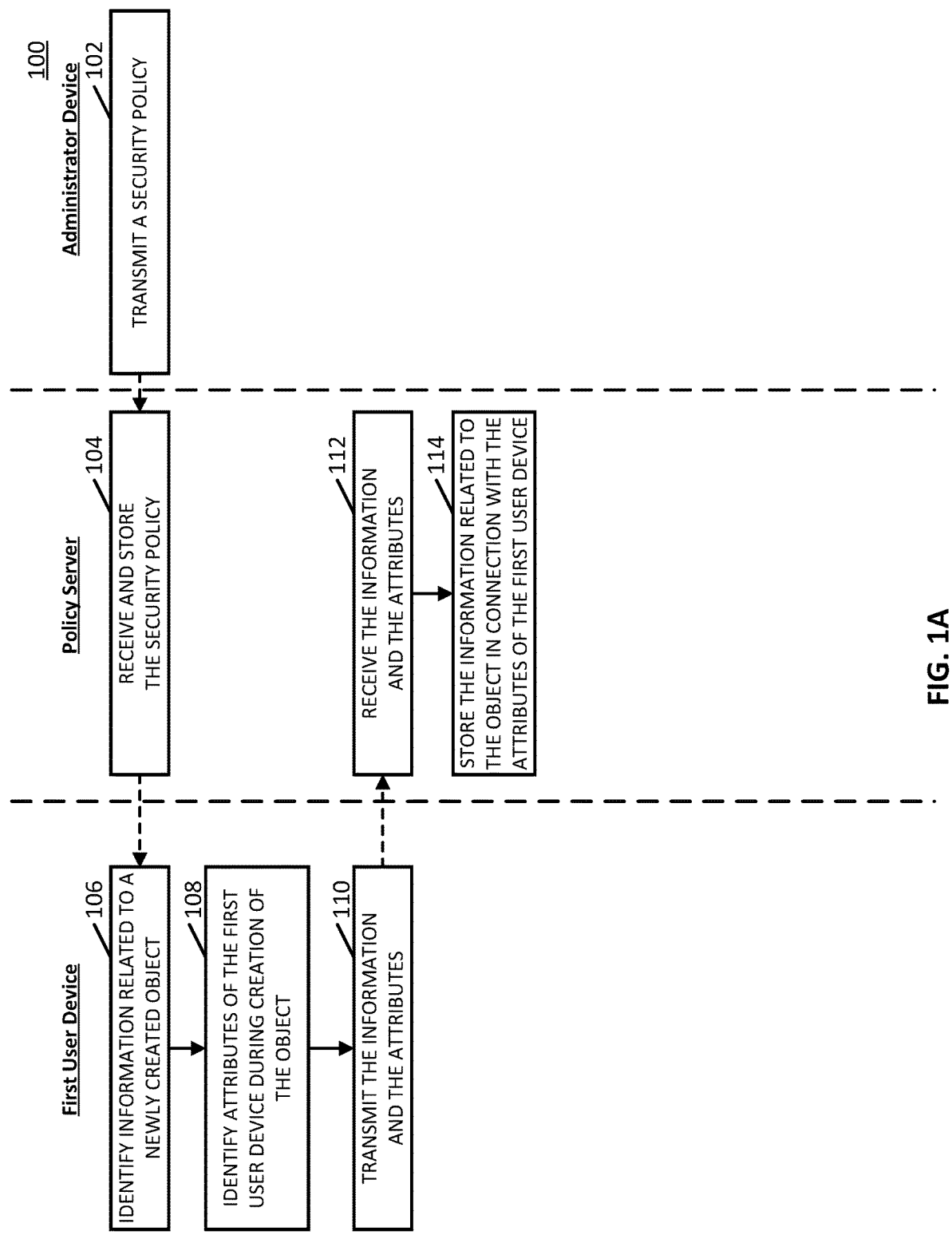
FIGS. 1A and 1B show examples of information flow diagrams for protecting computer systems from user-created objects in accordance with some embodiments of the disclosed subject matter.

In accordance with various embodiments, mechanisms (which can include methods, systems, and media) for protecting computer systems from user-created objects are provided.

In some embodiments, the mechanisms described herein can protect computers from security threats posed by newly created objects, created by, for example, users within an organization. In some embodiments, objects can include documents (e.g., word documents, and/or any other suitable type of documents), documents with embedded macros, media content (e.g., images, audio content, video content, and/or any other suitable type of media content), archive files that include multiple documents or files, scripts, compiled executables, and/or any other suitable type of objects. In some embodiments, an object can be created by a first user device and can be shared with a second user device. In some embodiments, the mechanisms described herein can match attributes associated with a first user device that created an object to a security policy created by an administrator, and the mechanisms can then cause the security policy to be implemented by a second user device that attempts to access or use the object created by the first user device.

In some embodiments, the mechanisms described herein can store security policies (e.g., administrator-created security policies), where each security policy indicates attributes of one or more user devices that will create or has created objects to which the security policy is to be applied. For example, in some embodiments, the attributes can include information (e.g., an operating system of the first user device, whether a particular security update has been installed on the first user device, and/or any other suitable information about the first user device) about a first user device used to create an object and/or information (e.g., a role of the user within an organization) about a user of the first user device. In some embodiments, the security policies can be stored such that a security policy can be retrieved based on the attributes included in the security policy.

In some embodiments, the mechanisms can cause a first user device that created an object to transmit, to a policy server, information about the object and/or information about the first user device that created the object, such as shown in and described below in connection with FIG. 1A. In some embodiments, in an instance in which an object created by the first user device is shared with a second user device, the second user device can query the policy server for a security policy to be applied to the shared object, such as shown in and described below in connection with FIG. 1B. In some embodiments, a policy server can identify attributes of the shared object and can subsequently identify a security policy to be applied to a shared object based on the attributes of the first user device that created the shared object, such as shown in and described below in connection with FIG. 1B.

In some embodiments, a security policy can indicate any suitable action(s) to be taken by a second user device that attempts to open or access an object created by a first user device. For example, in some embodiments, the security policy can indicate that the object is allowed to be opened or launched on the second user device. As another example, in some embodiments, the security policy can indicate that the object is to be blocked from being opened or launched on the second user device. As yet another example, in some embodiments, the security policy can indicate that a particular trust level is to be applied to the object by the second user device. As a more particular example, in some embodiments, the trust level can indicate actions the object is allowed to take on the second user device, such as accessing particular directories or types of directories, writing to certain files or types of files, deleting files or types of files on the second user device, accessing or editing a system registry, installing or deleting applications or particular types of applications, and/or any other suitable actions.

In some embodiments, by capturing attributes of an objector attributes indicating a state of a device that created an object during creation of the object, a security policy can be identified that is to be applied to the object. In some embodiments, by identifying and implementing a security policy based on attributes of a newly created object, objects that pose a security threat can be identified while minimizing false positive security threat detections.

Turning to FIG. 1A, an example 100 of an information flow diagram for protecting computer systems from user-created objects is shown in accordance with some embodiments of the disclosed subject matter. As illustrated, in some embodiments, blocks of process 100 can be executed by a first user device, a policy server, and/or an administrator device. Note that, in some embodiments, actions described as performed by the first user device can be performed by any suitable security software executing on the first user device.

At 102, the administrator device can transmit a security policy to the policy server. In some embodiments, the security policy can indicate any suitable information. For example, in some embodiments, the security policy can indicate actions that are to be taken in connection with objects that are associated with particular attributes. In some embodiments, an attribute can indicate information about a device that created an object at any suitable time (e.g., at a time the object was created, at a time the object was last modified, and/or any other suitable time). For example, in some embodiments, an attribute can include information associated with a device used to create an object (e.g., an operating system of the device, a latest version of security software installed on the device, a patch level of security software installed on the device, a latest version of an application used to create the object installed on the device, whether the object was created during a remote session, and/or any other suitable device information) information about a user of the device used to create the object (e.g., an identifier of a user of the device, a role of a user of the device, groups a user of the device belongs to, and/or any other suitable user information), date information (e.g., a date the object was created, a time the object was created, and/or any other suitable date information), and/or any other suitable information.

In some embodiments, the security policy can include a group of any suitable number of attributes such that one or more actions included in the security policy are to be taken for objects that match the attributes included in the security policy. For example, in some embodiments, a particular security policy can include a group of attributes such as: ["created using Application A;" "created by a user in an Administrator role;" "created using a device running Operating System X"]. Continuing further with this example, in some embodiments, the security policy can specify an action that is to be taken for objects that match the attributes in the group of attributes (e.g., allow execution of the object, block execution of the object, further analyze the object, transmit a security alert to a particular user or device, and/or any other suitable action(s)). Note that, in some embodiments, attributes associated with a security policy can be modified at any suitable time. For example, in some embodiments, a particular security policy can initially indicate that objects created using Application A are allowed to be opened or launched. Continuing further with this example, the security policy can later be modified, in any suitable manner, for example, to indicate that objects created using Application A that were created after a particular date and/or time or that were created using Application A by a particular user are to be further analyzed or blocked.

Note that, in some embodiments, a security policy can indicate any suitable action(s) that are to be taken in connection with objects that match attributes included in the security policy. For example, in some embodiments, the action(s) can include allowing the object to be launched or to execute on a user device, allowing the object to be opened on a user device, blocking the object from being launched or from executing on a user device, blocking the object from being opened on a user device, assigning a trust level or a reputation to the object (e.g., "trusted," "restricted," "not trusted," and/or any other suitable trust level or reputation) that indicates activities the object is allowed to perform on a user device (e.g., access particular directories or files, access particular categories of directories or files, write to particular directories or files, write to particular categories of directories or files, and/or any other suitable activities), causing a security alert to be presented on a user device in response to detecting that the object has been selected for opening on the user device, and/or any other suitable action(s). Note that, in some embodiments, the security policy can include multiple actions.

At 104, the policy server can receive and store the security policy. In some embodiments, the policy server can store the security policy in connection with the attributes associated with the security policy such that the security policy can be retrieved by the policy server based on the attributes included in the security policy. As a more particular example, in some embodiments, the policy server can store the security policy in a database as a key-value pair, where attributes associated with the security policy can be keys used to retrieve the security policy. As a specific example, in an instance in which Security Policy A includes a group of attributes ["created using Application A;" "created by a user in an Administrator role;" "created using a device running Operating System X" ], the policy server can store the security policy such that Security Policy A can be retrieved from the database in response to a query that includes the attributes "created using Application A," "created by a user in an Administrator role," and/or "created using a device running Operating System X" as keys.

Note that, in some embodiments, the administrator device can transmit a security policy at 102 and the policy server can store the security policy at 104 at any suitable time(s). Additionally, in some embodiments, the administrator device can generate and transmit any suitable number of security policies (e.g., one, two, ten, one hundred, one thousand, and/or any other suitable number). For example, in some embodiments, the administrator device can generate and transmit multiple security policies that are to be applied to objects associated with different attributes. Additionally, note that, in some embodiments, the policy server can receive and store security policies received from multiple administrator devices.

Note that, in some embodiments, referring to FIG. 1A, a security policy can be modified or updated at any suitable time by a user of the administrator device. For example, in some embodiments, a security policy can be modified to include additional or different attributes. As another example, in some embodiments, a security policy can be modified to include additional or different actions to be taken in connection with objects to which the security policy is applied.

At 106, the first user device can identify information related to a newly created object. In some embodiments, the newly created object can be any suitable type of object created on the user device, such as a document (e.g., a word document, and/or any other suitable type of document), a document with an embedded macro, media content (e.g., images, audio content, video content, and/or any other suitable type of media content), an archive file that includes multiple documents or files, a script, a compiled executable, and/or any other suitable type of objects. In some embodiments, the first user device can identify any suitable information related to the newly created object. For example, in some embodiments, the first user device can identify information related to a name of an application used to create the object, a type of the object (e.g., whether the object is a document, a script, a compiled executable, a document that includes a macro, and/or any other suitable type of object), a location of the object (e.g., a path of the object, whether the object is located in a shared drive, and/or any other suitable location information), any suitable file information associated with the object (e.g., an extension of a file corresponding to the object, magic bytes and/or any other suitable file signature of a file corresponding to the object that indicate a file type corresponding to the object, a size of a file corresponding to the object, and/or any other suitable file information), date or time information associated with the object (e.g., a date and/or a time the object was created, a most recent date and/or time the object was modified, and/or any other suitable date and/or time information), and/or any other suitable information associated with the object.

Note that, in some embodiments, the first user device can determine whether a newly created object is to be analyzed (e.g., using security software executing on the first user device), and, in some embodiments, the first user device can identify information related to the newly created object in response to determining that the newly created object is to be analyzed. In some embodiments, the first user device can determine whether a newly created object is to be analyzed based on any suitable information. For example, in some embodiments, the first user device can determine whether a newly created object is likely to be shared with other users and/or transmitted to other devices. As a more particular example, in some embodiments, the first user device can determine that compiled executables or scripts are likely to be shared with other users and/or transmitted to other devices and are therefore to be analyzed. As another more particular example, in some embodiments, the first user device can determine that objects located in particular locations (e.g., a particular shared drive or path, and/or in any other suitable location) are likely to be shared with other users and are therefore to be analyzed.

In some embodiments, the first user device can generate a hash value that represents the information related to the object. In some embodiments, the first user device can generate the hash value in any suitable manner, for example, using any suitable information related to the object as an input to a hashing function that generates the hash value. In some embodiments, any suitable information related to the object can be used to generate the hash value, such as a filename of the object, an extension of a file corresponding to the object, an identifier of an application used to create the object, and/or any other suitable information. For example, an object with a filename of "MyExecutable.exe" created using "ApplicationA.exe" can be associated with a hash value of 4c7f54dd825a4fd9f0ff7285588cc37.

At 108, the first user device can identify attributes of the first user device during creation of an object (e.g., at a time the object was initially created on the first user device, at a time the object was last modified on the first user device, and/or at any other suitable time point). In some embodiments, the attributes can include any suitable information related to a state of the first user device during creation of the object. For example, in some embodiments, the attributes can include information about an operating system of the first user device (e.g., an identifier of the operating system, a version number of the operating system, whether particular operating system updates have been installed, whether particular security patches have been installed, and/or any other suitable operating system information), information about security software executing on the first user device (e.g., a version number of the security software, whether particular updates to the security software have been installed, and/or any other suitable security software information), and/or any other suitable user device information. As another example, in some embodiments, the attributes can include information about a user of the first user device, such as an identifier of the user, a role of the user within the organization (e.g., that the user is an administrator of a computer network associated with the organization, and/or any other suitable role), a group within the organization that the user has been assigned to (e.g., that the user belongs to a security group, that the user belongs to a developer group, and/or any other suitable group information), a current status of the user (e.g., that the user is currently active at the organization, and/or any other suitable status information), and/or any other suitable user information. Note that, in some embodiments, the first user device can identify any suitable combination of attributes related to the first user device and attributes related to a user of the user device. For example, attributes identified by the first user device can include: ["created using a device running Operating System X;" "created by a user in an Administrator role" ].

At 110, the first user device can transmit the information related to the object and the attributes of the first user device or of the user of the first user device to the policy server. Note that, in instances in which the first user device generates a hash value that represents the information related to the object, the first user device can transmit the hash value to the policy server.

At 112, the policy server can receive the information related to the object and the attributes of the first user device or of the user of the first user device.

At 114, the policy server can store the information related to the object in connection with the attributes of the first user device or of the user of the first user device. In some embodiments, the policy server can store the information related to the object in connection with the attributes of the first user device or of the user of the first user device such that the policy server can retrieve the attributes based on the information related to the object. For example, in some embodiments, the policy server can store the information related to the object and the attributes in a database as key-value pairs such that the attributes (values) can be retrieved by using the information related to the object as one or more keys. As a more particular example, in an instance in which the information related to the object is represented as a hash value (e.g., 4c7f54dd0825a4fd9f0ff7285588cc37, and/or any other suitable hash value), the attributes can be retrieved from the database by querying the database with the hash value as a key.

Figure 1B:
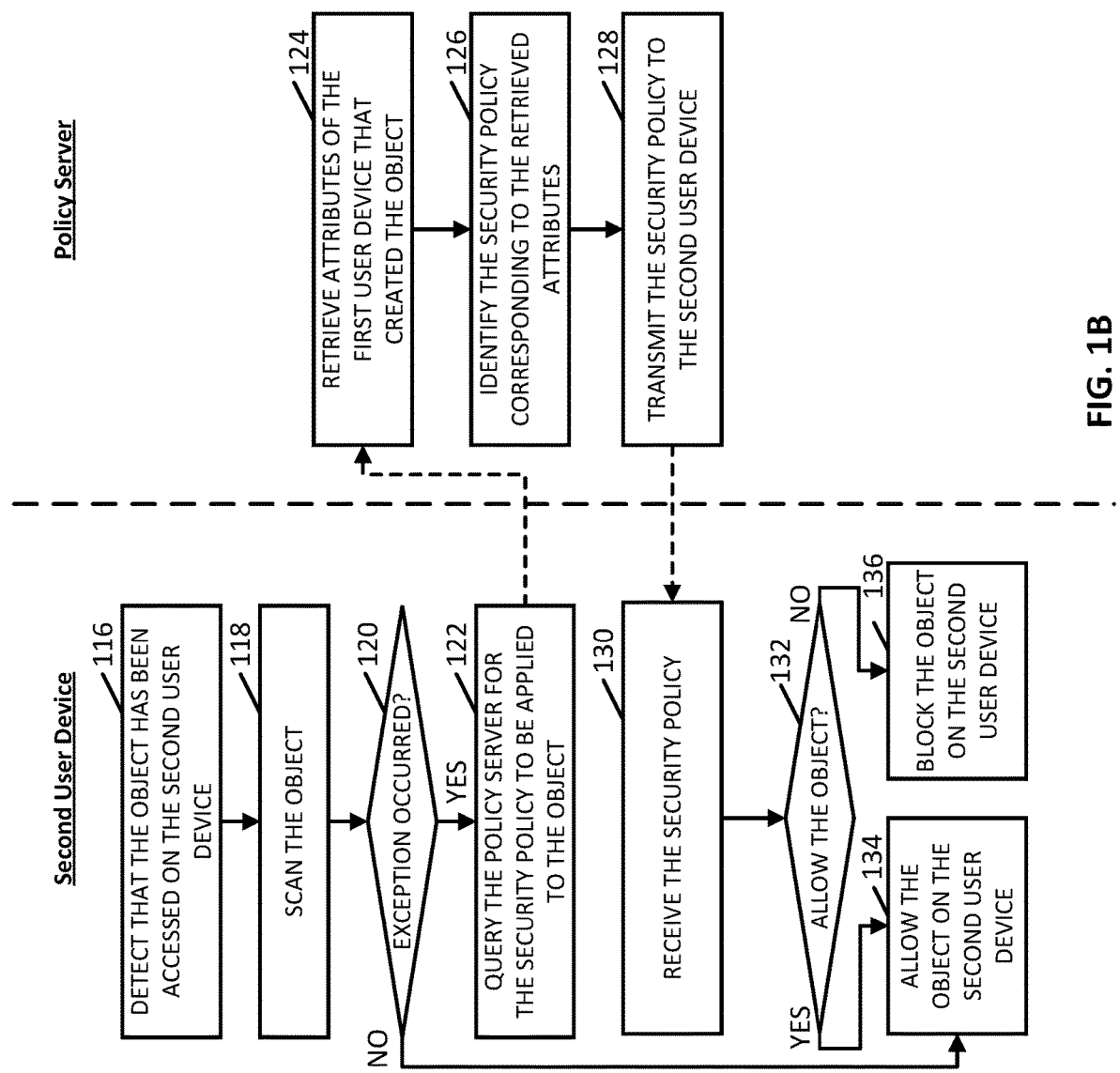

Turning to FIG. 1B, an example 150 of an information flow diagram for retrieving and implementing a security policy associated with an accessed object is shown in accordance with some embodiments of the disclosed subject matter. As illustrated, blocks of process 150 can be executed by a second user device and the policy server. Note that, in some embodiments, the second user device can be any suitable user device that receives or accesses an object created by the first user device, such as shown in and described above in connection with FIG. 1A. Additionally, note that, in some embodiments, any suitable functions described as performed by the second user device can be performed by any suitable security software executing on the second user device.

At 116, the second user device can detect that the object has been accessed on the second user device. In some embodiments, the second user device can detect any suitable type of access, such as that the object has been downloaded to the second user device (e.g., from an email, from a chat message, from a file sharing service, and/or downloaded from any other suitable location), that the object has been selected to be opened on the second user device, that the object has been selected to be launched on the second user device, and/or accessed in any other suitable manner.

At 118, the second user device can scan the object. In some embodiments, the second user device can scan the object in any suitable manner. For example, in some embodiments, security software executing on the second user device can scan the object to determine if the object is likely to be a security threat based on any suitable information or combination of information. As a more particular example, in some embodiments, the security software executing on the second user device can determine whether any information associated with the object matches any stored virus or malware definitions stored by the security software that indicate known security threats. As another example, in some embodiments, the second user device can scan the object to identify any suitable information about the object, such as an object type (e.g., that the object is a document, a script, a compiled executable, and/or any other suitable object type), and/or any other suitable information.

At 120, the second user device can determine whether an exception occurred. In some embodiments, the second user device can determine whether an exception occurred using any suitable technique or combination of techniques. For example, in some embodiments, the second user device can determine that an exception occurred in response to determining that information associated with the object matches a virus or malware definition representing a known security threat. As another example, in some embodiments, the second user device can determine that an exception occurred in response to determining that the object is of a particular object type (e.g., a compiled executable, a script, and/or any other suitable object type).

If, at 120, the second user device determines that no exception occurred ("no" at 120), the second user device can proceed to 134 and can allow the object to be opened or executed on the second user device.

If, at 120, the second user device determines that an exception occurred ("yes" at 120), the second user device can proceed to 122, and can query the policy server for a security policy to be applied to the object. In some embodiments, the second user device can query the policy server in any suitable manner. For example, in some embodiments, the second user device can transmit, to the policy server, an indication of the object (e.g., a name of the object, a hash value representing an identifier of the object and/or an application that created the object, and/or any other suitable indication of the object) and a request for a security policy corresponding to the object.

Note that, in some embodiments, the object may not be scanned by the security software executing on the second user device at 118. In some such embodiments, blocks 118 and 120 can be omitted, and the second user device can proceed to 122 from 116. Additionally, in some embodiments, the second user device can determine that objects of a certain type (e.g., executables, and/or any other suitable type of object) are not to be scanned, and the policy server is to be queried at 122 for all objects of that type.

At 124, the policy server can retrieve attributes of the first user device that created the object based on the indication of the object transmitted by the first user device. For example, in some embodiments, the policy server can retrieve attributes of the first user device that were stored in connection with the information related to the object, such as shown in and described above in connection with 114 of FIG. 1A. As a more particular example, in an instance in which the information related to the object is represented with a hash value, and in which the second user device transmits a hash value corresponding to the object at 120, the policy server can retrieve attributes of the first user device by querying a database using the hash value. As a specific example, for an object with a corresponding hash value of 4c7f54dd0825a4fd9f0ff7285588cc37, the policy server can retrieve attributes of the first user device that created the object, such as ["created using a device running Operating System X;" "created by a user in an Administrator role" ].

At 126, the policy server can identify a security policy corresponding to the retrieved attributes. For example, in some embodiments, the policy server can identify a security policy by comparing attributes of security policies in a group of security policies to attributes of the first user device that created the object. As a more particular example, in some embodiments, the policy server can identify a security policy from a group of security policies that matches or most closely matches attributes of the first user device. As a specific example, in an instance in which the attributes of the first user device that created the object to be accessed by the second user device are ["created using a device running Operating System X;" "created by a user in an Administrator role" ], the policy server can identify a security policy that includes matching attributes. Continuing with this specific example, in an instance in which a first security policy has attributes of ["created using a device running Operating System X;" "created by a user in an Administrator role" ] and a second security policy has attributes of ["created using a device running Operating System Y;" "created by a user in an Administrator role" ], the policy server can identify the first security policy as the security policy corresponding to the retrieved attributes. Note that, in some embodiments, in an instance in which the policy server cannot identify a security policy that exactly matches the retrieved attributes, the policy server can identify a security policy that includes attributes similar to the retrieved attributes. For example, in an instance in which a first security policy has attributes of ["created using a device running Operating System X" ] and in which a second security policy has attributes of ["created using a device running Operating System Y;" "created by a user in an Administrator role" ], the policy server can identify the first security policy as having attributes most similar to the retrieved attributes.

Note that, in some embodiments, the security policy can indicate any other suitable information about the object. For example, in some embodiments, the security policy can indicate that the object is a locally-created object (e.g., local to an organization or entity associated with the first user device and/or the second user device). As another more particular example, in some embodiments, the security policy can indicate that the object was created by the first user device that is associated with a particular organization that the second user device is also associated with. As another more particular example, in some embodiments, the security policy can indicate that the object was created by the first user device that is connected to a particular communication network (e.g., a local area network associated with a particular organization, and/or any other suitable network) that the second user device is also connected to and/or that the first user device was previously connected to the communication network that the second user device is connected to.

At 128, the policy server can transmit the security policy to the second user device. As described above, the security policy can indicate an action to be taken by the second user device in connection with the object. Note that, in some embodiments, the policy server can transmit information indicating an action to be performed by the second user device in connection with the object, where the action is specified by the identified security policy, rather than transmitting the security policy to the second user device. For example, in an instance in which the security policy indicates that an object associated with the attributes indicated in the security policy are to be allowed to execute on a user device, the policy server can transmit an indication that the object is to be allowed to execute to the second user device. Conversely, in an instance in which the security policy indicates that an object with the attributes indicated in the security policy are to be blocked on a user device, the policy server can transmit an indication that the object is to be blocked from being opened or blocked from executing to the second user device. As another example, in some embodiments, in an instance in which the security policy indicates that the object is to be assigned a particular trust level that indicates activities the object is permitted to perform on the second user device, the policy server can transmit an indication to the second user device that indicates the trust level to be assigned to the object by the second user device.

At 130, the second user device can receive the security policy from the policy server.

At 132, the second user device can determine whether to allow the object to be opened or launched on the second user device based on the security policy.

Note that, at 132, in some embodiments, the second user device can determine whether the object is a locally-created object (e.g., an object created in connection with a particular organization or entity) based on the security policy. For example, in some embodiments, the second user device can determine whether the object was created by a first user device that is associated with an organization the second user device is associated with. As another example, in some embodiments, the second user device can determine whether the object was created by a first user device that is connected to a communication network (e.g., a local area network associated with a particular organization, and/or any other suitable network) that the second user device is connected to and/or whether the first user device was previously connected to the communication network that the second user device is connected to.

If, at 132, the second user device determines that the object is allowed to be opened or launched on the second user device ("yes" at 132), the second user device can proceed to 134, and can allow the object to opened or launched on the second user device. Note that, in some embodiments, in an instance in which the security policy indicates a trust level to be assigned to the object, the second user device can assign the trust level to the object at 134. In some such embodiments, the second user device can then allow the object to be opened or launched, and can cause the object to be opened or to execute on the second user device subject to constraints specified by the assigned trust level. For example, in some embodiments, the second user device can allow an object that is an executable file to execute on the second user device, but can inhibit or block the object from performing particular activities based on the trust level (e.g., writing to particular files or directories, writing to particular categories of files or directories, accessing particular files or directories, accessing particular categories of files or directories, and/or any other suitable activities).

If, at 132, the second user device determines that the object is not to be allowed to be opened or launched on the second user device ("no" at 132), the second user device can proceed to 136 and can block the object on the second user device. In some embodiments, the second user device can block the object in any suitable manner. For example, in some embodiments, the second user device can present a message that indicates that the object could not be opened and/or launched because a security threat was detected in connection with the object.

Note that, in some embodiments, the second user device can cause information indicating an action that was taken (e.g., allowing the object to be accessed at 134, blocking the object from being accessed at 136, assigning a particular trust level to the object, and/or any other suitable action) to be logged in any suitable manner. For example, in some embodiments, the second user device can transmit information indicating action to the server, which can store the information in any suitable type of log. In some such embodiments, logged actions can be retrieved by any suitable user device (e.g., a user device of an administrator of a network, and/or any other suitable user device) and can be reviewed (e.g., manually reviewed, and/or reviewed in any other suitable manner). For example, in some embodiments, an action corresponding to blocking a particular object can be reviewed to determine whether the object was correctly blocked, or, conversely, whether a security policy that caused the object to be blocked is to be modified. As another example, in some embodiments, an action corresponding to allowing a particular object to be accessed can be reviewed to determine whether the object was correctly allowed, or, conversely, whether a security policy that caused the object to be allowed is to be modified.

Additionally, note that, in some embodiments, a security policy can be modified or updated at any suitable time, such as described above in connection with 102 of FIG. 1A. For example, in some embodiments, a security policy can be modified to indicate a different action to be taken in connection with objects to which the security policy is to be applied. As a more particular example, in some embodiments, a security policy can initially indicate that objects corresponding to the security policy are to be assigned a first trust level (e.g., "trusted," and/or any other suitable trust level), and the security policy can later be updated to indicate that objects corresponding to the security policy are to be assigned a second trust level different from the first trust level (e.g., "restricted," and/or any other suitable trust level). Continuing with this example, in some embodiments, in response to determining that a security policy has been updated, the policy server can transmit the updated security policy to any user devices that have requested a security policy corresponding to an object to which the updated security policy is to be applied. For example, referring to FIG. 1B, in some embodiments, the policy server can transmit the updated security policy to the second user device in response to determining that the security policy that was transmitted to the second user device as described above in connection with 128 of FIG. 1B has been updated. Additionally, in some embodiments, the policy server can transmit the updated security policy to any user devices (e.g., a third user device, and/or any other suitable user device) that receives an object to which the updated security policy is to be applied. For example, in an instance in which the object is shared from the first user device of FIG. 1A with a third user device after a security policy is updated, the policy server can cause the updated security policy to be transmitted to the third user device.

Figure 2:
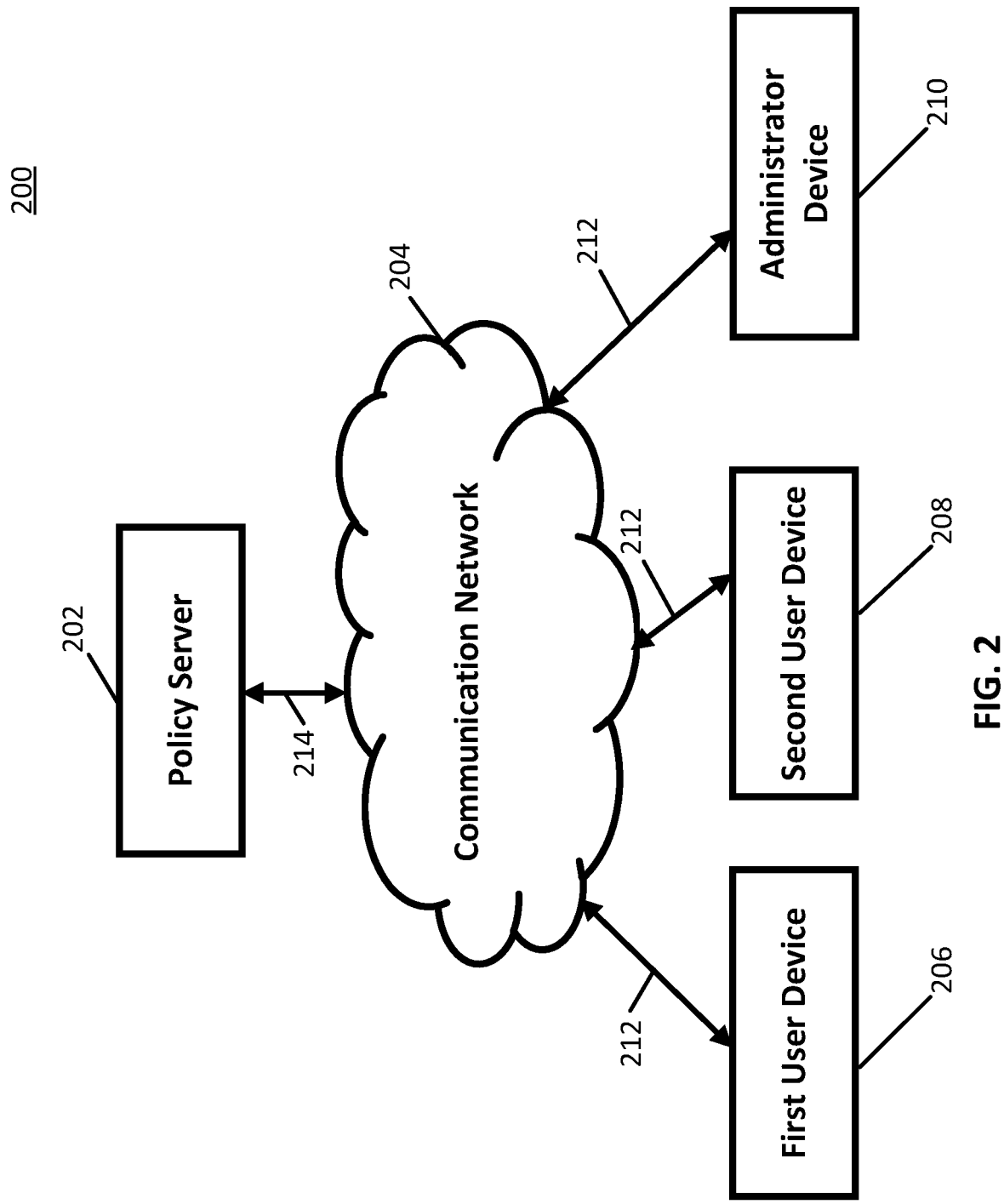
FIG. 2 shows a schematic diagram of an illustrative system suitable for implementation of mechanisms described herein for protecting computer systems from user-created objects in accordance with some embodiments of the disclosed subject matter.

Turning to FIG. 2, an example 200 of hardware for protecting computer systems from user-created objects that can be used in accordance with some embodiments of the disclosed subject matter is shown. As illustrated, hardware 200 can include a policy server 202, a communication network 204, a first user device 206, a second user device 208, and/or an administrator device 210.

In some embodiments, policy server 202 can be any suitable server for storing any suitable security policies, data, programs, and/or any other suitable content. For example, in some embodiments, policy server 202 can store one or more policies created by an administrator of a computer network, such as shown in and described above in connection with FIG. 1A. As another example, in some embodiments, policy server 202 can receive a request from a user device to retrieve a security policy that relates to a particular object and can transmit the security policy to the user device in response to the request, such as shown in and described above in connection with FIG. 1B. Note that, in some embodiments, security policies can be stored in a database which can be accessed by policy server 202 in any suitable manner.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, first user device 206, second user device 208, and/or administrator device 210 can be connected by one or more communications links 212 to communication network 204. In some embodiments, communication network 204 can be linked via one or more communications links 214 to policy server 202. Communications links 212 and/or 214 can be any communications links suitable for communicating data among policy server 202, first user device 206, second user device 208, and/or administrator device 210, such as network links, dial-up links, wireless links, hard-wired links, any other suitable communications links, or any suitable combination of such links.

In some embodiments, first user device 206 can be any suitable user device used to create an object, such as a document (e.g., a word document, and/or any other suitable type of document), a documents with an embedded macro, media content (e.g., images, audio content, video content, and/or any other suitable type of media content), an archive file that includes multiple documents or files, a script, a compiled executable, and/or any other suitable type of object. For example, in some embodiments, first user device 206 can be any suitable type of user device, such as a laptop computer, a desktop computer, a tablet computer, a virtual assistant device, an Internet of Things (IoT) device, a media player, a game console, a wearable computer, and/or any other suitable type of user device. In some embodiments, security software executing on first user device 206 can identify and transmit any suitable information or attributes associated with an object created on first user device 206 and/or associated with a state of first user device 206 to policy server 202, such as shown in and described above in connection with FIG. 1A.

In some embodiments, second user device 208 can be any suitable type of user device that can be used to access an object (e.g., by opening a document or other file, by causing an executable or script to launch or begin execution, and/or accessed in any other suitable manner). In some embodiments, second user device 208 can be any suitable type of user device, such as a laptop computer, a desktop computer, a tablet computer, a virtual assistant device, an Internet of Things (IoT) device, a media player, a game console, a wearable computer, and/or any other suitable type of user device. In some embodiments, security software executing on second user device 208 can request a security policy from policy server 202 that corresponds to an object accessed on second user device 208, and can cause any suitable action indicated in the security policy to be implemented in connection with the object, such as shown in and described above in connection with FIG. 1B.

In some embodiments, administrator device 210 can be any suitable type of device (e.g., a laptop computer, a desktop computer, a tablet computer, and/or any other suitable type of device) that can be used by an administrator of a computer network to perform any suitable actions. For example, in some embodiments, administrator device 210 can generate a security policy to be applied objects created by user device with particular attributes and can transmit the security policy to policy server 202, such as shown in and described above in connection with FIG. 1A.

Although policy server 202 is illustrated as one device, in some embodiments, the functions performed by policy server 202 can be performed using any suitable number of devices in some embodiments. For example, in some embodiments, multiple devices can be used to implement the functions performed by policy server 202.

Although one each of first user device 206, second user device 208, and administrator device 210 are shown in FIG. 2, in some embodiments, and/or any suitable types of user devices, can be used in some embodiments.

Figure 3:
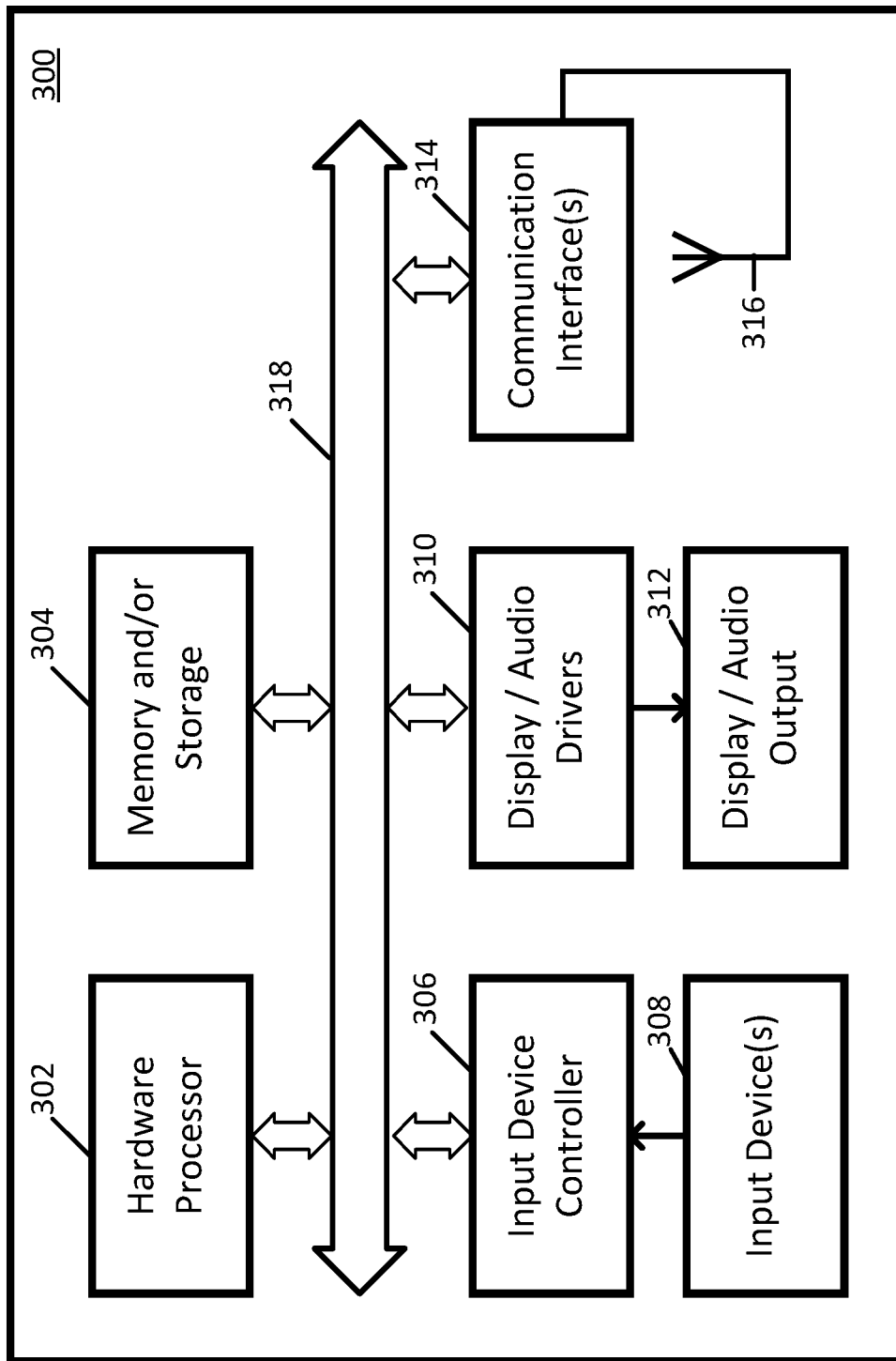
FIG. 3 shows a detailed example of hardware that can be used in a server and/or a user device of FIG. 2 in accordance with some embodiments of the disclosed subject matter.

Policy server 202, first user device 206, second user device 208, and/or administrator device 210 can be implemented using any suitable hardware in some embodiments. For example, in some embodiments, devices 202, 206, 208, and/or 210 can be implemented using any suitable general-purpose computer or special-purpose computer. For example, in some embodiments, a mobile phone may be implemented using a special-purpose computer. Any such general-purpose computer or special-purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 302 can be controlled by a server program stored in memory and/or storage of a server, such as policy server 202. In some embodiments, hardware processor 302 can be controlled by a computer program stored in memory and/or storage of a user device, such as one of first user device 206, second user device 208, and/or administrator device 210.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks (e.g., computer network 204). For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

In some embodiments, at least some of the above described blocks of the processes of FIGS. 1A and 1B can be executed or performed in any order or sequence not limited to the order and sequence shown in and described in connection with the figures. Also, some of the above blocks of FIGS. 1A and 1B can be executed or performed substantially simultaneously where appropriate or in parallel to reduce latency and processing times. Additionally or alternatively, some of the above described blocks of the processes of FIGS. 1A and 1B can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for protecting computer systems from user-created objects are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for protecting computer systems from user-created objects, comprising:
   detecting, at a second user device, that an object has been accessed on the second user device;
   determining whether an exception has occurred by scanning the object on the second user device;
   in response to determining that the exception has occurred, transmitting, from the second user device to a server, a request for a security policy to be applied by the second user device in connection with the object, wherein the request includes an identifier of the object;
   receiving, from the server, the security policy, wherein the security policy was selected by the server in response to receiving the request based on at least one attribute of the object including information about security software running on a first user device at a time at which the object was created by the first user device;
   determining, based on the security policy, that the object was created by the first user device associated with an organization the second user device is also associated with;
   determining whether to allow the object to be accessed by the second user device based on the security policy;
   in response to determining that the object is allowed to be accessed, allowing the object to be accessed on the second user device; and
   assigning the object a trust level on the second user device based on the security policy.

2. The method of claim 1, further comprising:
   determining whether to allow a second object to be accessed by the second user device based on a second security policy to be applied by the second user device in connection with the second object; and
   in response to determining that the second object is not to be allowed, blocking the second object from being accessed by the second user device in response to determining that the second object is not to be allowed.

3. The method of claim 1, wherein the trust level indicates a type of directory allowed to be accessed on the second user device.

4. The method of claim 1, wherein the object is received from the first user device that created the object.

5. The method of claim 1, wherein the security policy is identified by the server based on a plurality of attributes of the first user device that created the object.

6. The method of claim 5, wherein the plurality of attributes of the first user device include version information of software executing on the first user device during creation of the object.

7. A system for protecting computer systems from user-created objects, the system comprising:
   a memory; and
   a hardware processor coupled to the memory that is programmed to:
      detect, at a second user device, that an object has been accessed on the second user device;
      determine whether an exception has occurred by scanning the object on the second user device;
      in response to determining that the exception has occurred, transmit, from the second user device to a server, a request for a security policy to be applied by the second user device in connection with the object, wherein the request includes an identifier of the object;
      receive, from the server, the security policy, wherein the security policy was selected by the server in response to receiving the request based on at least one attribute of the object including information about security software running on a first user device at a time at which the object was created by the first user device;
      determine, based on the security policy, that the object was created by the first user device associated with an organization the second user device is also associated with;
      determine whether to allow the object to be accessed by the second user device based on the security policy;
      in response to determining that the object is allowed to be accessed, allow the object to be accessed on the second user device; and
      assign the object a trust level on the second user device based on the security policy.

8. The system of claim 7, wherein the hardware processor is further programmed to:
   determine whether to allow a second object to be accessed by the second user device based on a second security policy to be applied by the second user device in connection with the second object; and
   in response to determining that the second object is not to be allowed, block the second object from being accessed by the second user device in response to determining that the second object is not to be allowed.

9. The system of claim 7, wherein the trust level indicates a type of directory allowed to be accessed on the second user device.

10. The system of claim 7, wherein the object is received from the first user device that created the object.

11. The system of claim 7, wherein the security policy is identified by the server based on a plurality of attributes of the first user device that created the object.

12. The system of claim 11, wherein the plurality of attributes of the first user device include version information of software executing on the first user device during creation of the object.

13. A non-transitory computer-readable medium containing computer executable instructions that, when executed by a processor, cause the processor to perform a method for protecting computer systems from user-created objects, the method comprising:
   detecting, at a second user device, that an object has been accessed on the second user device;
   determining whether an exception has occurred by scanning the object on the second user device;
   in response to determining that the exception has occurred, transmitting, from the second user device to a server, a request for a security policy to be applied by the second user device in connection with the object, wherein the request includes an identifier of the object;
   receiving, from the server, the security policy, wherein the security policy was selected by the server in response to receiving the request based on at least one attribute of the object including information about security software running on a first user device at a time at which the object was created by the first user device;

determining, based on the security policy, that the object was created by the first user device associated with an organization the second user device is also associated with;

determining whether to allow the object to be accessed by the second user device based on the security policy;

in response to determining that the object is allowed to be accessed, allowing the object to be accessed on the second user device; and assigning the object a trust level on the second user device based on the security policy.

14. The non-transitory computer-readable medium of claim 13, wherein the method further comprises:

determining whether to allow a second object to be accessed by the second user device based on a second security policy to be applied by the second user device in connection with the second object; and in response to determining that the second object is not to be allowed, blocking the second object from being accessed by the second user device in response to determining that the second object is not to be allowed.

15. The non-transitory computer-readable medium of claim 13, wherein the trust level indicates a type of directory allowed to be accessed on the second user device.

16. The non-transitory computer-readable medium of claim 13, wherein the object is received from the first user device that created the object.

17. The non-transitory computer-readable medium of claim 13, wherein the security policy is identified by the server based on a plurality of attributes of the first user device that created the object.

18. The non-transitory computer-readable medium of claim 17, wherein the plurality of attributes of the first user device include version information of software executing on the first user device during creation of the object.

* * * * *